United States Patent
Kirk et al.

(10) Patent No.: US 9,736,242 B2
(45) Date of Patent: Aug. 15, 2017

(54) FIBRE CHANNEL SWITCH SYSTEM

(71) Applicant: Dell Products L.P., Round Rock, TX (US)

(72) Inventors: Jeffrey S. Kirk, Austin, TX (US); Jason Garth Pearce, Round Rock, TX (US); Kevin Allen Hughes, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 14/460,068

(22) Filed: Aug. 14, 2014

(65) Prior Publication Data

US 2016/0050277 A1   Feb. 18, 2016

(51) Int. Cl.
*H04L 12/931* (2013.01)
*H04L 29/08* (2006.01)
*H04L 12/721* (2013.01)
*H04L 29/12* (2006.01)

(52) U.S. Cl.
CPC ......... *H04L 67/1097* (2013.01); *H04L 45/72* (2013.01); *H04L 49/357* (2013.01); *H04L 61/6045* (2013.01)

(58) Field of Classification Search
None
See application file for complete search history.

(56) References Cited

U.S. PATENT DOCUMENTS

| | | | |
|---|---|---|---|
| 2011/0110232 A1* | 5/2011 | Abraham | H04L 41/5025 370/235 |
| 2011/0110241 A1* | 5/2011 | Atkinson | H04L 41/22 370/242 |
| 2013/0148663 A1* | 6/2013 | Xiong | H04L 45/745 370/392 |
| 2014/0119371 A1* | 5/2014 | Desai | H04L 49/351 370/392 |

* cited by examiner

*Primary Examiner* — Yemane Mesfin
*Assistant Examiner* — Jeff Banthrongsack
(74) *Attorney, Agent, or Firm* — Haynes and Boone, LLP (57) ABSTRACT

A Fiber Channel (FC) switch system includes a server IHS and a storage IHS that each communicate using an FC protocol. A switch IHS couples the server IHS to the storage IHS. A first converter in the switch IHS receives first FC data traffic from the server IHS and converts it to first FC over Ethernet (FCoE) data traffic. A protocol processing engine in the switch IHS is coupled to the first converter and receives the first FCoE data traffic from the first converter and processes it to provide second FCoE data traffic for delivery to the storage IHS. A second converter in the switch IHS is coupled to the protocol processing engine and the storage IHS and receives the second FCoE data traffic from the protocol processing engine, converts it to second FC data traffic, and sends the second FC data traffic to the storage IHS.

15 Claims, 7 Drawing Sheets

FIBRE CHANNEL SWITCH SYSTEM

BACKGROUND

The present disclosure relates generally to information handling systems, and more particularly to a Fibre Channel switch system for information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include storage area networks (SANs) that provide a plurality of storage IHSs that communicate with server IHSs to provide storage of information for the server IHSs. In many cases, those SANs are connected to the server IHSs using a Fibre Channel (FC) fabric that is currently the core component of most SANs. That FC fabric is enabled using FC switch IHSs that incorporate expensive and proprietary FC switch chips and FC software stacks. Those expensive and proprietary FC switch chips and FC software stacks require relatively large upfront investments that have provided a barrier to entry to the FC market that has resulted in a consolidation of the FC market, and impeded the adoptions of SANs.

Accordingly, it would be desirable to provide an improved FC switch system.

SUMMARY

According to one embodiment, a Fibre Channel (FC) switch system includes a first converter that is coupled to a first port and that is configured to receive first FC data traffic from an initiator system through the first port and convert the first FC data traffic to first FC over Ethernet (FCoE) data traffic; a protocol processing engine that is coupled to the first converter and that is configured to receive the first FCoE data traffic from the first converter and process the first FCoE data traffic to provide second FCoE data traffic for delivery to a target system; and a second converter that is coupled to the protocol processing engine and a second port, wherein the second converter is configured to receive the second FCoE data traffic from the protocol processing engine, convert the second FCoE data traffic to second FC data traffic, and send the second FC data traffic through the second port to the target system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
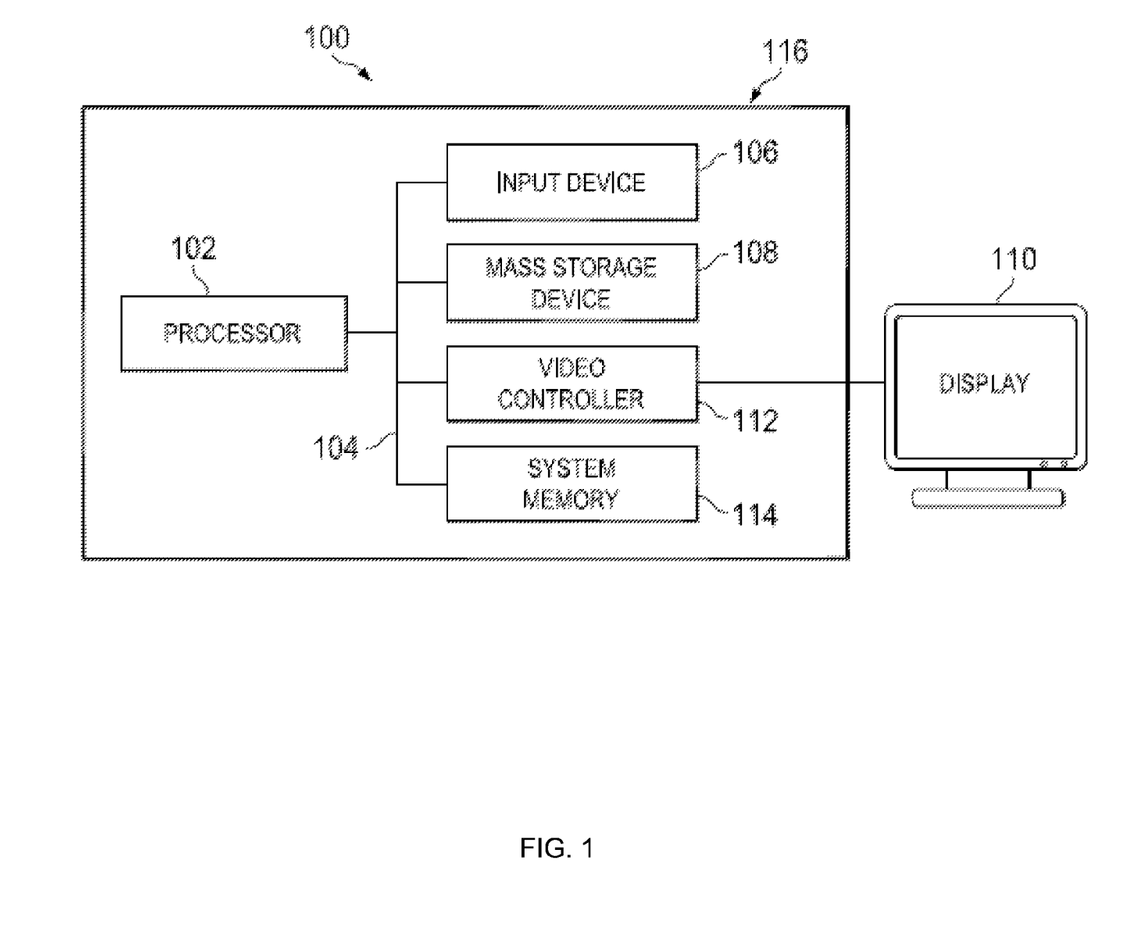
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
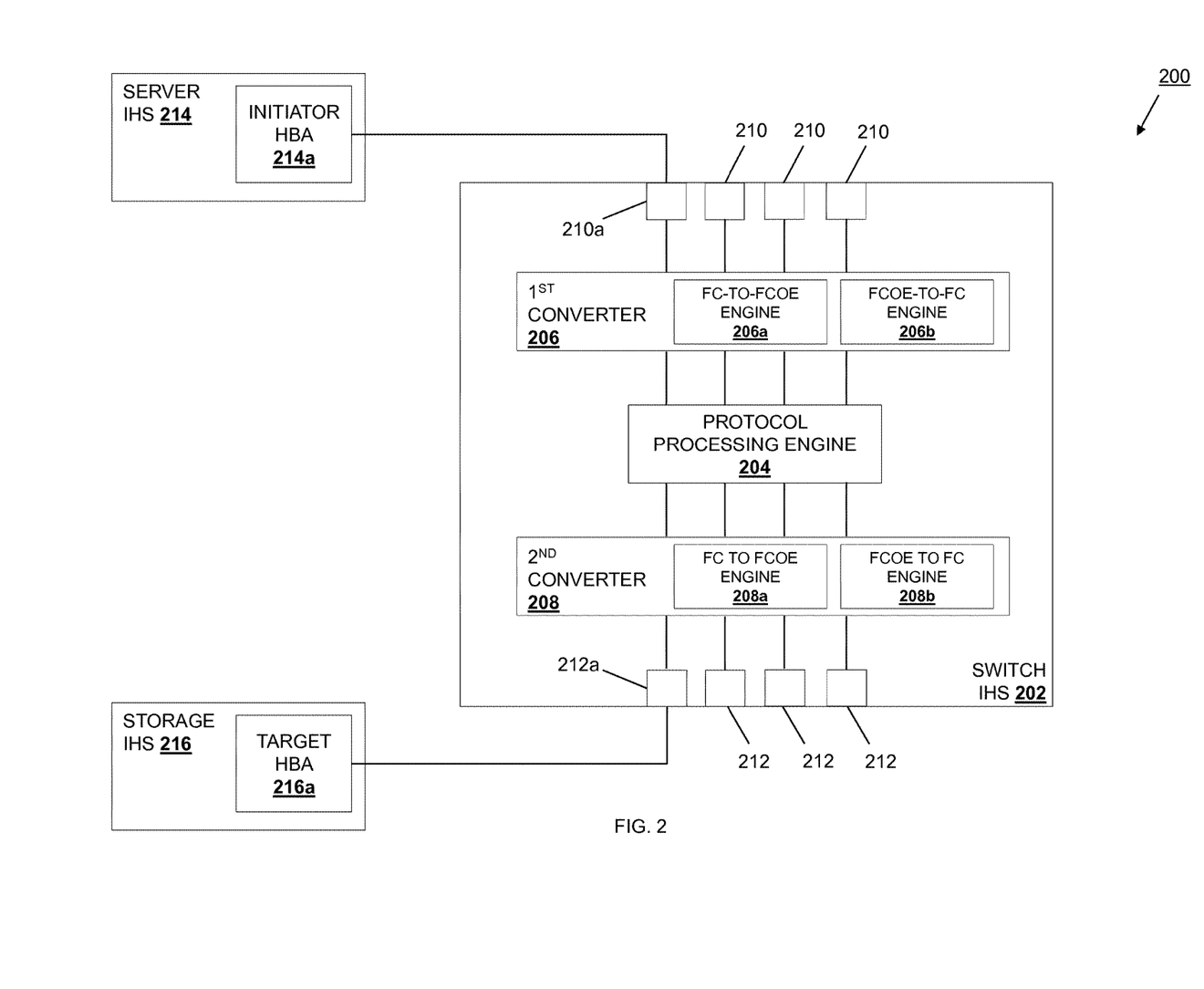
FIG. 2 is a schematic view illustrating an embodiment of a Fibre Channel (FC) switch system.

Referring now to FIG. 2, an embodiment of a Fibre Channel (FC) switch system 200 is illustrated. The FC switch system 200 includes a switch IHS 202 which may be, for example, the IHS 100 discussed above with reference to FIG. 1, and/or which may include some or all of the components of the IHS 100. The switch IHS 202 includes a protocol processing engine 204 that may be provided by a processing system, such as the processor 102 discussed above with reference to FIG. 1, and a memory system, such as the system memory 114 discussed above with reference to FIG. 1. For example, the memory system may include instructions that, when executed by the processing system, cause the processing system to perform the functions of the protocol processing engine 204 discussed below. In an embodiment, the processing system that provides the protocol processing engine 204 includes an Ethernet switch chip such as, for example, an Ethernet switch Application Specific Integrated Circuit (ASIC), and a Central Processing Unit (CPU). While in the embodiments discussed below, specific actions are discussed as being performed by the CPU and the Ethernet switch chip, in different embodiments, the actions performed by the CPU may be performed by the Ethernet switch chip or some other processing system (e.g., a processing system that performs the actions of both the CPU and the Ethernet switch chip) while remaining within the scope of the present disclosure. In an embodiment, the memory system that provides the protocol processing engine 204 may include Ethernet layer 2 (L2) forwarding tables.

As discussed above, conventional FC fabrics utilize FC switch IHSs that include expensive and proprietary FC switch chips, and the FC switch system 200 of the present disclosure may provide at least a portion of an FC fabric that includes the switch IHS 202 with an Ethernet switch chip that one of skill in the art will recognize is relatively inexpensive compared to the FC switch chips discussed above based on the widespread use of Ethernet switch chips in a variety of networking applications and the resulting economies of scale. In the embodiments discussed in further detail below, the switch IHS 202 may provide for the transmission of FC data traffic between server IHSs and storage IHSs utilizing an Ethernet switch chip, which operates via a different Open System Interconnect (OSI) physical (PHY) layer than FC switch chips included in conventional FC switch IHSs, and the converters and software stack discussed below. However, one of skill in the art in possession of the present disclosure will recognize how different processing systems, converters, and software stacks may enable other inexpensive chips to replace the FC switch chips discussed above while remaining within the scope of the present disclosure. As discussed above, the processing system that provides the protocol processing engine 204 may also include a Central Processing Unit (CPU) that, for example, handles control protocols and configuration of the switch IHS 202 as discussed below, while the Ethernet switch chip performs data traffic processing and forwarding.

The FC switch system 200 includes a first converter 206 that may include, for example, a PHY chip and a memory system that includes instructions that, when executed by the PHY chip, cause the PHY chip to provide an FC-to-FCoE engine 206a, an FCoE-to-FC engine 206b, and/or perform any of the other functions of the first converter 206 discussed below. As described below, the FC-to-FCoE engine 206a and/or the FCoE-to-FC engine 206b may operate as FC/FCoE encapsulator/decapsultors at the PHY layer, providing an FC port-level state machine, framing, and PHY level FC/FCoE conversion. The FC switch system 200 also includes a second converter 208 that may include, for example, a PHY chip and a memory system that includes instructions that, when executed by the PHY chip, cause the PHY chip to provide an FC-to-FCoE engine 208a, an FCoE-to-FC engine 208b, and/or perform any of the other functions of the second converter 208 discussed below. As described below, the FC-to-FCoE engine 208a and/or the FCoE-to-FC engine 208b may operate as FCoE/FC encapsulator/decapsultors at the PHY layer, providing an FC port-level state machine, framing, and PHY level FCoE/FC conversion. The first converter 206 is coupled to a plurality of ports 210 on the switch IHS 202, and the second converter 208 is coupled to a plurality of ports 212 on the switch IHS 202.

The FC switch system 200 also includes a server IHS 214. In an embodiment, the server IHS 214 may be, for example, the IHS 100 discussed above with reference to FIG. 1, and/or may include some or all of the components of the IHS 100. In the illustrated embodiment, the server IHS 214 includes an initiator Host Bus Adapter (HBA) 214a that is coupled to a first port 210a of the plurality of ports 210 on the switch IHS 202 using a cable or other coupling system known in the art. The FC switching system 200 also includes a storage IHS 216. In an embodiment, the storage IHS 216 may be, for example, the IHS 100 discussed above with reference to FIG. 1, and/or may include some or all of the components of the IHS 100. In the illustrated embodiment, the storage IHS 216 includes a target Host Bus Adapter (HBA) 216a that is coupled to a second port 212a of the plurality of ports 212 on the switch IHS 202 using a cable or other coupling system known in the art. One of skill in the art in possession of the present disclosure will recognize that the use of "initiator" and "target" with reference to the HBAs 214a and 216a is provided for clarity of discussion with regard to the example of server/storage communications discussed below, and different communication examples will fall within the scope of the present disclosure. As discussed below, each of the server IHS 214 and the storage IHS 216 may include memory systems that include instructions that, when executed by processing systems in the server IHS 214 or storage IHS 216, cause the processing systems to communicate using FC Protocols in order to, for example, transport Small Computer System Interface (SCSI) commands over a FC network (e.g., the FC fabric including the switch IHS 202) provided between them.

Referring now to FIGS. 3a, 3b, 4a, 4b, and 5, methods 300, 400, and 500 are illustrated and described for providing an FC switch system. Specifically, an embodiment of a method 300 for providing storage/switch set-up in the FC switch system 200 is first described, a method 400 for providing server/switch set-up in the FC switch system 200 is then described, and then a method 500 for providing server/storage communication in the FC switch system 200 is described. The methods 300 and 400 are discussed below as setting up and providing communication between the single server IHS 214 and the single storage IHS 216 using the switch IHS 202, but communications between any number of server IHSs and storage IHSs may be set up in a similar manner, and one of skill in the art in possession of the present disclosure will recognize that the methods 300 and 400 may be performed concurrently, may overlap, may be performed in a reverse order relative to that presented herein, and/or may be subject to other modifications while remaining within the scope of the present disclosure and allowing for the method 500 to be performed as discussed below. In the embodiments discussed below, the Initiator HBA 214*a* and the Target HBA 216*a* may be configured in a common zone such that they may communicate, as would be understood by one of skill in the art.

Figure 3A:
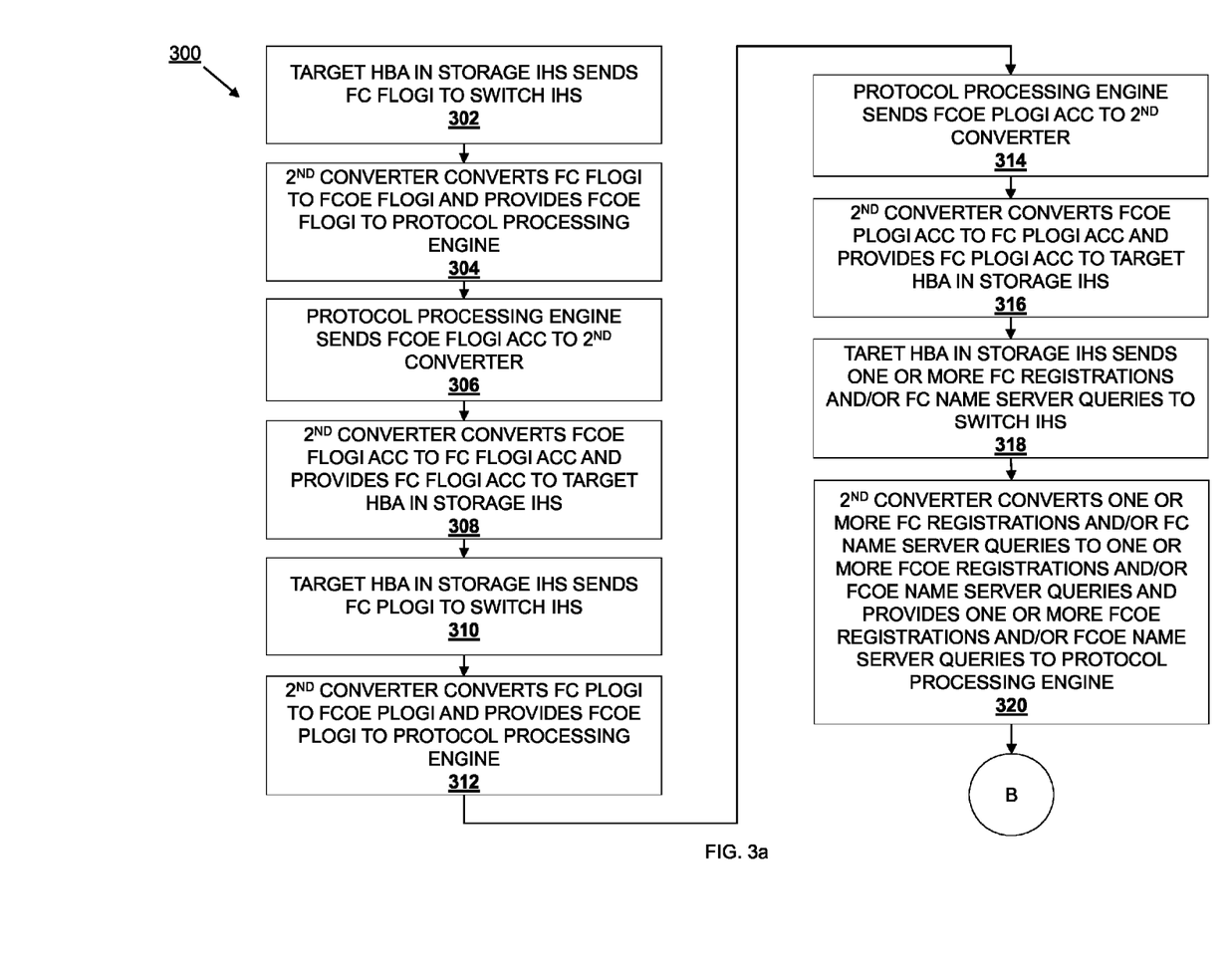
FIG. 3a is a flow chart illustrating an embodiment of a portion of a method for storage/switch set-up in the FC switch system of FIG. 2.
Figure 3B:
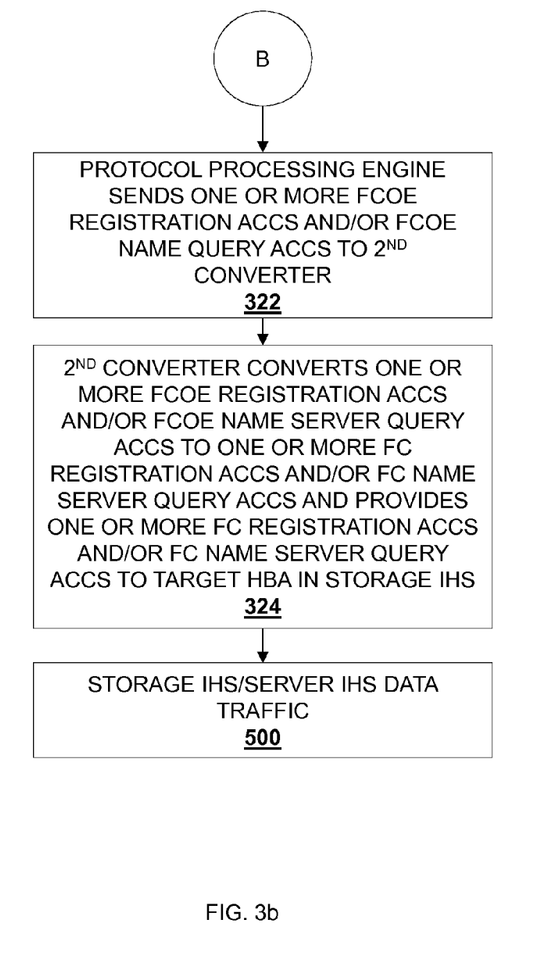
FIG. 3b is a flow chart illustrating an embodiment of a portion of a method for storage/switch set-up in the FC switch system of FIG. 2.

Referring first to FIGS. 3*a* and 3*b*, the method 300 for providing storage/switch set-up is illustrated. In an embodiment, the method 300 may begin when the processing system of the switch IHS 202 first runs FC switch code in a software stack that is stored in the memory system of the switch IHS 202 in response to, for example, connection, power up, or other initialization of the FC switching system 200. In some embodiments, during port initialization of the switch IHS 202 and prior to the method 300, the second converter 208 is programmed (e.g., by programming the PHY chip) to perform a formatted conversion of native FC traffic (e.g., 8 Gb/s FC traffic) into formatted FC over Ethernet (FCoE) traffic (e.g., 10GE FCoE frames). For example, the second converter 208 may be programmed to prepend a specific 3 byte FC-MAP (currently 00:00:00) to all incoming FC traffic FCID's, producing a specific 10GE frame of format (currently 00:00:00:DD:AA:PP, where DD=domain (the first byte of the FCID), AA=area (the second byte of the FCID), and PP=port (the third byte of the FCID, also referred to as the Arbitrated Loop Physical Address (ALPA))) for both source and destination addresses.

In some embodiments, during switch initialization of the switch IHS 202 and prior to the method 300, FCoE formatted FC Well Known Addresses (WKA's) are registered in the second converter 208 as Ethernet bridging protocol addresses, which operates to direct incoming FC Well Known Address (WKA) traffic that has been converted to the formatted FCoE traffic to be sent to the Ethernet switch chip such that it may be handled using the FC switch code that is executable by the CPU. In addition, standard Ethernet bridging protocol addresses (e.g., bridging protocol data units such as 01:80:c2:XX:XX:XX frames) may be deregistered from the Ethernet switch chip. For example, the cache in the switch IHS 202 that includes standard Ethernet bridging protocol addresses may be cleared, and in some cases the resulting default multicast/broadcast addresses may be cleared as well, followed by the provisioning of FC style entries in the cache of the switch IHS 202. Furthermore, the Ethernet switch may also be configured to not forward broadcast, multicast, or unknown unicast data traffic. As discussed in the method 300 below, the FC switch code executable by the CPU handles and generates protocol frames in the specific FCoE format discussed herein.

The method 300 begins at block 302 where the target HBA in the storage IHS sends an FC fabric login (FLOGI) to the switch IHS. In an embodiment, the target HBA 216*a* in the storage IHS 216 generates and sends an FC FLOGI that may include the Login Server WKA 0xFFFFFE to the second port 212*a* on the switch IHS 202. In an example, that FC FLOGI may include a System Identification (SID) (e.g., 00:00:00, an unassigned FC identification) and a Destination Identification (DID) (e.g., FF:FF:FE, the Login Server WKA).

The method 300 then proceeds to block 304 where the second converter converts the FC FLOGI to an FCoE FLOGI and provides the FCoE FLOGI to the protocol processing engine. In an embodiment, the second converter 208 receives the FC FLOGI through the second port 212*a* and provides it to the FC-to-FCoE engine 208*a*, which operates to convert the FC FLOGI to an FCoE FLOGI by wrapping the FC FLOGI in an FCoE header and trailer. In an example, the FCoE FLOGI may include a source media access control (SMAC) address (e.g., 00:00:00:00:02:00), a destination MAC (DMAC) address (e.g., 00:00:00:FF:FF:FE, a pre-programmed layer 2 (L2) cache entry), a SID (e.g., 00:00:00) and a DID (e.g., FF:FF:FE). The second converter 208 sends that FCoE FLOGI to the protocol processing engine 204. In an embodiment, the Ethernet switch chip in the protocol processing engine 204 receives the FCoE FLOGI and provides it to the CPU in the protocol processing engine 204.

The method 300 then proceeds to block 306 where the protocol processing engine sends an FCoE FLOGI accept (ACC) to the second converter. In an embodiment, the protocol processing engine 204 receives the FCoE FLOGI and, if the FCoE FLOGI is accepted, replies with an FCoE FLOGI ACC that is sent to the second converter 208. In an embodiment, the CPU in the protocol processing engine 204 determines whether the FCoE FLOGI is accepted and, if so, sends an FCoE FLOGI ACC to the Ethernet switch chip in the protocol processing engine 204, which forwards the FCoE FLOGI ACC to the second converter 208. Processing actions to determine whether an FCoE FLOGI is accepted are known in the art and not discussed in further detail here. In an example, an FCoE FLOGI ACC may include an SMAC address (e.g., 00:00:00:FF:FF:FE), a DMAC address (e.g., 00:00:00:03:02:00), a SID (e.g. FF:FF:FE), and a DID (e.g., 03:02:00).

The method 300 then proceeds to block 308 where the second converter converts the FCoE FLOGI ACC to an FC FLOGI ACC and provides the FC FLOGI ACC to the target HBA in the storage IHS. In an embodiment, the second converter 208 receives the FCoE FLOGI ACC from the protocol processing engine 204 and provides it to the FCoE-to-FC engine 208*b*, which operates to convert the FCoE FLOGI ACC to an FC FLOGI ACC by stripping the FCoE header and trailer from the FCoE FLOGI ACC. In an example, the FC FLOGI ACC includes a SID (e.g., FF:FF:FE) and a DID (e.g., 03:02:00). The second converter 208 sends that FC FLOGI ACC through the second port 212*a* to the target HBA 216*a* in the storage IHS 216.

The method 300 then proceeds to block 310 where the target HBA in the storage IHS sends an FC port login (PLOGI) to the switch IHS. In an embodiment, in response to receiving the FC FLOGI ACC, the target HBA 216*a* in the storage IHS 216 generates and sends an FC PLOGI that may include the Name Server WKA 0xFFFFFC to the second port 212*a* on the switch IHS 202. In an example, the FC PLOGI includes a SID (e.g., 03:02:00) and a DID (e.g., FF:FF:FC, the Name Server WKA).

The method 300 then proceeds to block 312 where the second converter converts the FC PLOGI to an FCoE PLOGI and provides the FCoE PLOGI to the protocol processing engine. In an embodiment, the second converter 208 receives the FC PLOGI through the second port 212*a* and provides it to the FC-to-FCoE engine 208*a*, which operates to convert the FC PLOGI to an FCoE PLOGI by wrapping the FC PLOGI in an FCoE header and trailer. In an example, the FCoE PLOGI may include an SMAC address (e.g., 00:00:00:03:02:00), a DMAC address (e.g., 00:00:00:FF:FF:FC, a pre-programmed WKA L2 cache entry), a SID (e.g., 03:02:00) and a DID (e.g., FF:FF:FC). The second converter 208 sends that FCoE PLOGI to the protocol processing engine 204. In an embodiment, the Ethernet switch chip in the protocol processing engine 204 receives the FCoE PLOGI and provides it to the CPU in the protocol processing engine 204.

The method 300 then proceeds to block 314 where the protocol processing engine sends an FCoE PLOGI ACC to the second converter. In an embodiment, the protocol processing engine 204 receives the FCoE PLOGI and, if the FCoE PLOGI is accepted, replies with an FCoE PLOGI ACC that is sent to the second converter 208. In an embodiment, the CPU in the protocol processing engine 204 determines whether the FCoE PLOGI is accepted and, if so, sends an FCoE PLOGI ACC to the Ethernet switch chip in the protocol processing engine 204, which forwards the FCoE PLOGI ACC to the second converter 208. Processing actions to determine whether an FCoE PLOGI is accepted are known in the art and not discussed in further detail here. In an example, an FCoE PLOGI ACC may include an SMAC address (e.g., 00:00:00:FF:FF:FC), a DMAC address (e.g., 00:00:00:03:02:00), a SID (e.g. FF:FF:FC), and a DID (e.g., 03:02:00).

The method 300 then proceeds to block 316 where the second converter converts the FCoE PLOGI ACC to an FC PLOGI ACC and provides the FC PLOGI ACC to the target HBA in the storage IHS. In an embodiment, the second converter 208 receives the FCoE PLOGI ACC from the protocol processing engine 204 and provides it to the FCoE-to-FC engine 208b, which operates to convert the FCoE PLOGI ACC to an FC PLOGI ACC by stripping the FCoE header and trailer from the FCoE PLOGI ACC. In an example, the FC PLOGI ACC includes a SID (e.g., FF:FF: FC) and a DID (e.g., 03:02:00). The second converter 208 sends that FC PLOGI ACC through the second port 212a to the target HBA 216a in the storage IHS 216.

The method 300 then proceeds to block 318 where the target HBA in the storage IHS sends one or more FC name server registrations and/or FC name server queries to the switch IHS. In an embodiment, in response to receiving the FC PLOGI ACC, the target HBA 216a in the storage IHS 216 generates and sends one or more FC name server registrations and/or FC name server queries that may include a Name Server WKA 0xFFFFFC to the second port 212a on the switch IHS 202. In an example, the one or more FC name server registrations and/or FC name server queries includes a SID (e.g., 03:02:00) and a DID (e.g., FF:FF:FC).

The method 300 then proceeds to block 320 where the second converter converts the one or more FC name server registrations and/or FC name server queries to one or more FCoE name server registrations and/or FCoE name server queries and provides the one or more FCoE name server registrations and/or FCoE name server queries to the protocol processing engine. In an embodiment, the second converter 208 receives the one or more FC name server registrations and/or FC name server queries through the second port 212a and provides them to the FC-to-FCoE engine 208a, which operates to convert the one or more FC name server registrations and/or FC name server queries to one or more FCoE name server registrations and/or FCoE name server queries by wrapping the one or more FC name server registrations and/or FC name server queries in an FCoE header and trailer. In an example, the one or more FCoE name server registrations and/or FCoE name server queries may include an SMAC address (e.g., 00:00:00:03: 02:00), a DMAC address (e.g., 00:00:00:FF:FF:FC), a SID (e.g., 03:02:00) and a DID (e.g., FF:FF:FC). The second converter 208 sends those one or more FCoE name server registrations and/or FCoE name server queries to the protocol processing engine 204. In an embodiment, the Ethernet switch chip in the protocol processing engine 204 receives the one or more FCoE name server registrations and/or FCoE name server queries and provides the one or more FCoE name server registrations and/or FCoE name server queries to the CPU in the protocol processing engine 204.

The method 300 then proceeds to block 322 where the protocol processing engine sends one or more FCoE name server registration accepts (ACCS) and/or FCoE name server query ACCS to the second converter. In an embodiment, the protocol processing engine 204 receives the one or more FCoE name server registrations and/or FCoE name server queries and, if the one or more FCoE name server registrations and/or FCoE name server queries are accepted, replies with one or more FCoE name server registration ACCS and/or FCOE name server query ACCS that are sent to the second converter 208. In an embodiment, the CPU in the protocol processing engine 204 determines whether the one or more FCoE name server registrations and/or FCoE name server queries are accepted and, if so, sends the one or more FCoE name server registration ACCS and/or FC name server query ACCS to the Ethernet switch chip in the protocol processing engine 204, which provides the one or more FCoE name server registration ACCS and/or FC name server query ACCS to the second converter 208. Processing actions to determine whether one or more FCoE name server registrations and/or FCoE name server queries are accepted are known in the art and not discussed in further detail here.

Figure 5:
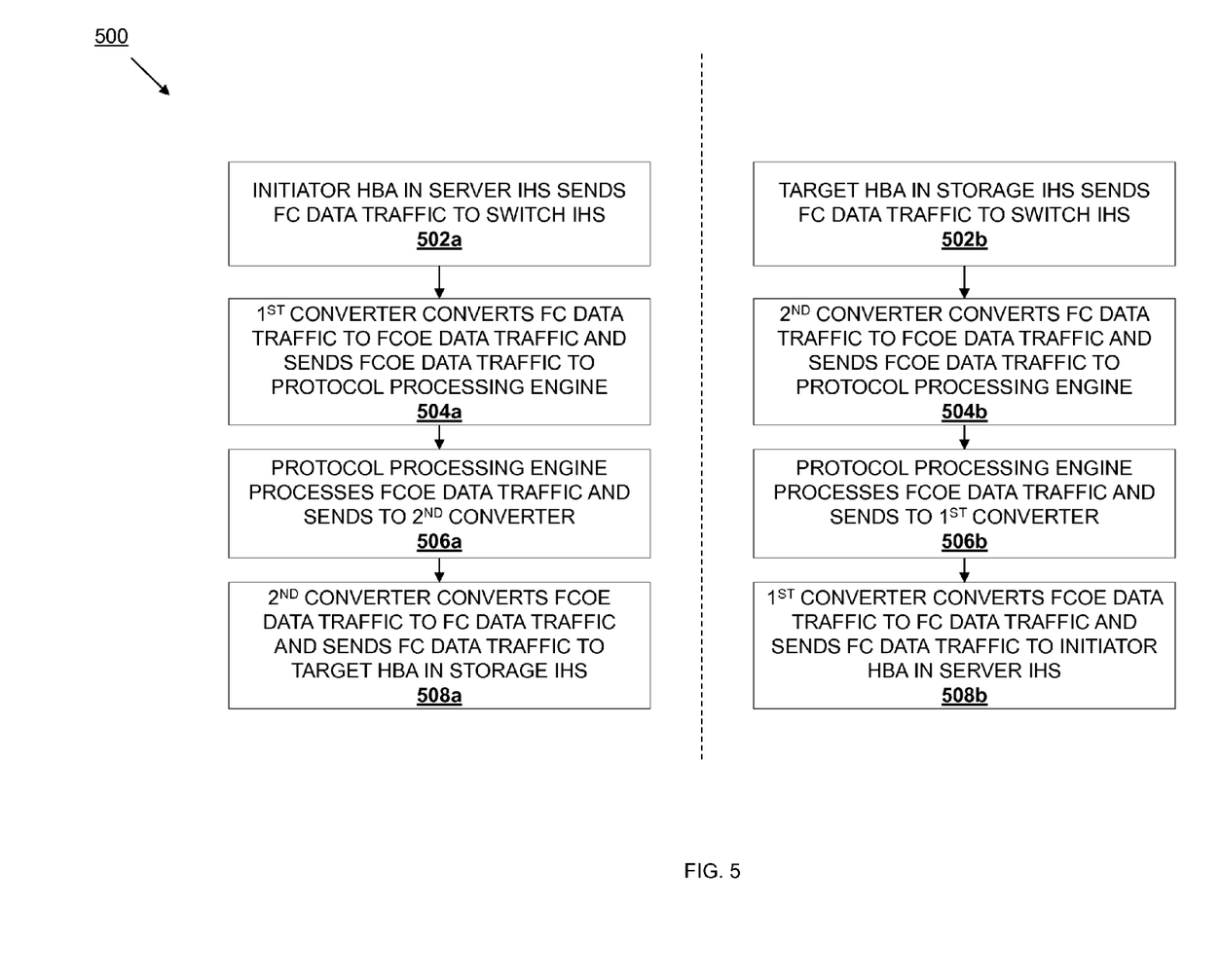
FIG. 5 is a flow chart illustrating an embodiment of a method for server/storage communication via the switch in the FC switch system of FIG. 2

The method 300 then proceeds to block 324 where the second converter converts the one or more FCoE name server registration ACCS and/or FCoE name server query ACCS to one or more FC name server registration ACCS and/or FC name server query ACCS and provides the one or more FC name server registration ACCS and/or FC name server query ACCS to the target HBA in the storage IHS. In an embodiment, the second converter 208 receives the one or more FCoE name server registration ACCS and/or FCoE name server query ACCS from the protocol processing engine 204 and provides it to the FCoE-to-FC engine 208b, which operates to convert the one or more FCoE name server registration ACCS and/or FCoE name server query ACCS to one or more FC name server registration ACCS and/or FC name server query ACCS by stripping the FCoE header and trailer from the one or more FCoE name server registration ACCS and/or FCoE name server query ACCS. The second converter 208 sends those one or more FCoE name server registration ACCS and/or FCoE name server query ACCS to the target HBA 216a in the storage IHS 216. Following the target HBA 216a in the storage IHS 216 receiving the one or more FCoE name server registration ACCS and/or FCoE name server query ACCS at block 324, the storage IHS 216 and switch IHS 202 are set up for communication, and the method 300 may proceed to method 500, discussed below, where the switch IHS 202 processes data traffic between the storage IHS 216 and the server IHS 214, discussed below.

Figure 4A:
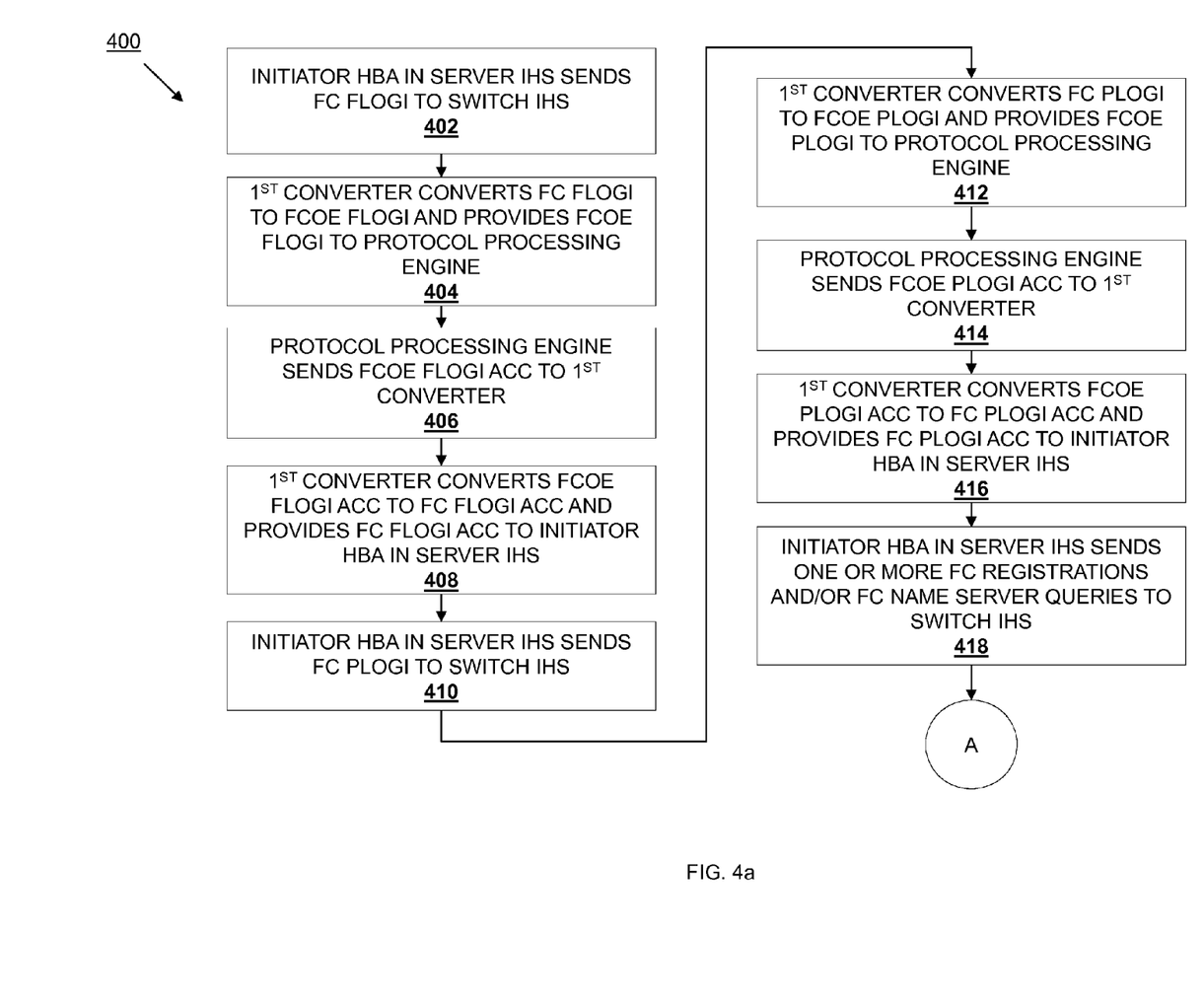
FIG. 4a is a flow chart illustrating an embodiment of a portion of a method for server/switch set-up in the FC switch system of FIG. 2.
Figure 4B:
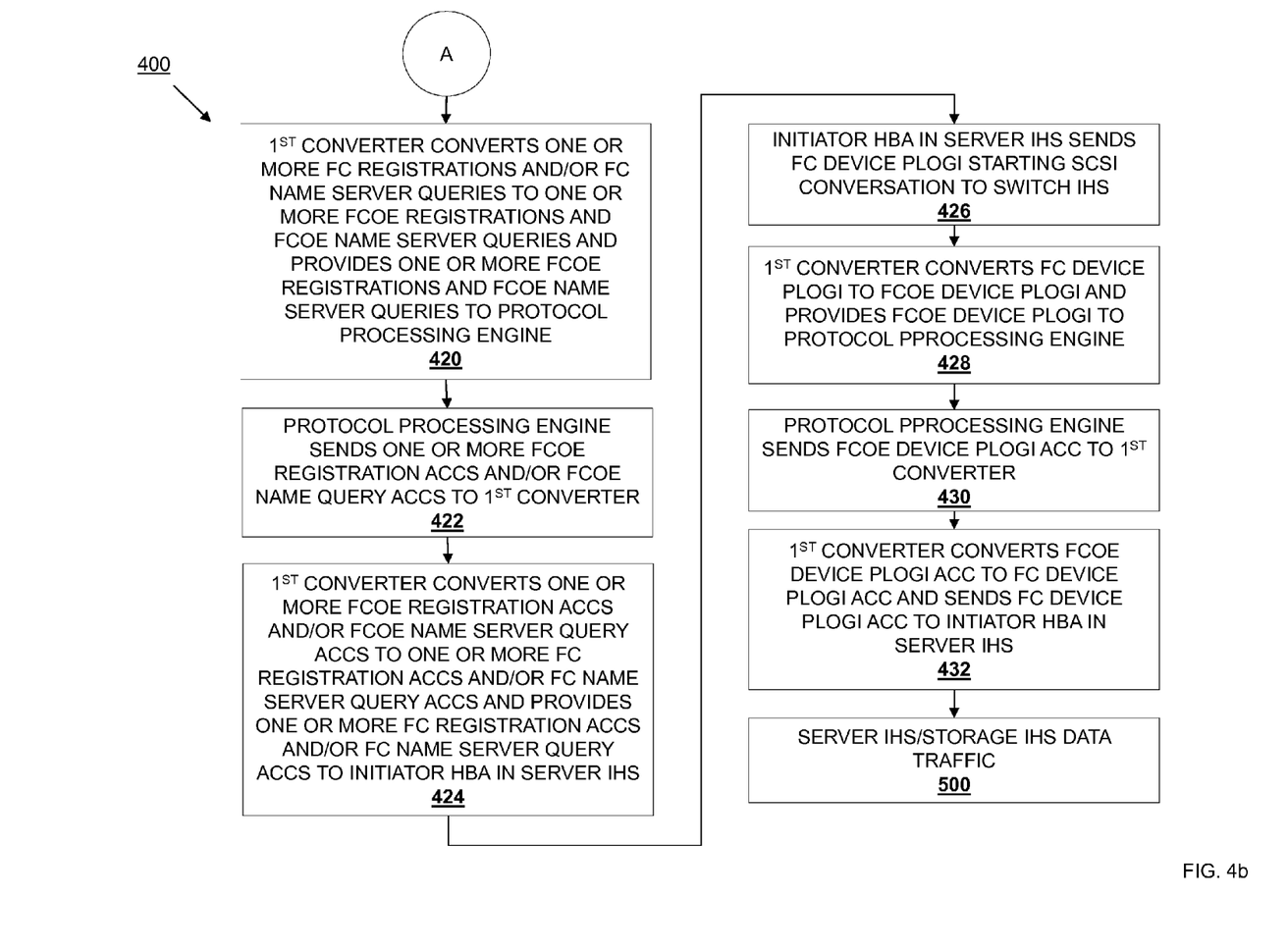
FIG. 4b is a flow chart illustrating an embodiment of a portion of a method for server/switch set-up in the FC switch system of FIG. 2.

Referring now to FIG. 4, the method 400 for providing server/switch set-up is illustrated. In an embodiment, the method 400 may begin when the processing system of the switch IHS 202 first runs FC switch code in a software stack that is stored in the memory system of the switch IHS 202 in response to, for example, connection, power up, or other initialization of the FC switching system 200. In some embodiments, during port initialization of the switch IHS 202 and prior to the method 400, the first converter 206 is programmed (e.g., by programming the PHY chip) to perform a formatted conversion of native FC traffic (e.g., 8 Gb/s FC traffic) into formatted FC over Ethernet (FCoE) traffic (e.g., 10GE FCoE frames). For example, the first converter 206 may be programmed to prepend a specific 3 byte FC-MAP (currently 00:00:00) to all incoming FC traffic FCID's, producing a specific 10GE frame of format (currently 00:00:00:DD:AA:PP, where DD=domain (the first byte of the FCID), AA=area (the second byte of the FCID), and PP=port (the third byte of the FCID, also referred to as the Arbitrated Loop Physical Address (ALFA))) for both source and destination addresses.

In some embodiments, during switch initialization of the switch IHS 202 and prior to the method 400, FCoE formatted FC Well Known Addresses (WKA's) are registered in the first converter 206 as Ethernet bridging protocol addresses, which operates to direct incoming FC Well Known Address (WKA) traffic that has been converted to the formatted FCoE traffic to be sent to the Ethernet switch chip such that it may be handled using the FC switch code that is executable by the CPU. In addition, standard Ethernet bridging protocol addresses may be deregistered from the Ethernet switch chip. Furthermore, the Ethernet switch chip may also be configured to not forward broadcast, multicast, or unknown unicast data traffic. As discussed in the method 400 below, the FC switch code in the CPU handles and generates protocol frames in the specific FCoE format discussed herein.

The method 400 begins at block 402 where the initiator HBA in the server IHS sends an FC fabric login (FLOGI) to the switch IHS. In an embodiment, the initiator HBA 214a in the server IHS 214 generates and sends an FC FLOGI that may include the Login Server WKA 0xFFFFFE to the first port 210a on the switch IHS 202. In an example, that FC FLOGI may include a System Identification (SID) (e.g., 00:00:00, an unassigned FC identification) and a Destination Identification (DID) (e.g., FF:FF:FE, the Login Server WKA).

The method 400 then proceeds to block 404 where the first converter converts the FC FLOGI to an FCoE FLOGI and provides the FCoE FLOGI to the protocol processing engine. In an embodiment, the first converter 206 receives the FC FLOGI through the first port 210a and provides it to the FC-to-FCoE engine 206a, which operates to convert the FC FLOGI to an FCoE FLOGI by wrapping the FC FLOGI in an FCoE header and trailer. In an example, the FCoE FLOGI may include a source media access control (SMAC) address (e.g., 00:00:00:00:01:00), a destination MAC (DMAC) address (e.g., 00:00:00:FF:FF:FE, a pre-programmed layer 2 (L2) cache entry), a SID (e.g., 00:00:00) and a DID (e.g., FF:FF:FE). The first converter 206 sends that FCoE FLOGI to the protocol processing engine 204. In an embodiment, the Ethernet switch chip in the protocol processing engine 204 receives the FCoE FLOGI and provides it to the CPU in the protocol processing engine 204.

The method 400 then proceeds to block 406 where the protocol processing engine sends an FCoE FLOGI accept (ACC) to the first converter. In an embodiment, the protocol processing engine 204 receives the FCoE FLOGI and, if the FCoE FLOGI is accepted, replies with an FCoE FLOGI ACC that is sent to the first converter 206. In an embodiment, the CPU I the protocol processing engine 204 determines whether the FCoE FLOGI is accepted and, if so, sends an FCoE FLOGI ACC to the Ethernet switch chip in the protocol processing engine 204, which forwards the FCoE FLOGI ACC to the first converter 206. Processing actions to determine whether an FCoE FLOGI is accepted are known in the art and not discussed in further detail here. In an example, an FCoE FLOGI ACC may include an SMAC address (e.g., 00:00:00:FF:FF:FE), a DMAC address (e.g., 00:00:00:03:01:00), a SID (e.g. FF:FF:FE), and a DID (e.g., 03:01:00).

The method 400 then proceeds to block 408 where the first converter converts the FCoE FLOGI ACC to an FC FLOGI ACC and provides the FC FLOGI ACC to the initator HBA in the server IHS. In an embodiment, the first converter 206 receives the FCoE FLOGI ACC from the protocol processing engine 204 and provides it to the FCoE-to-FC engine 206b, which operates to convert the FCoE FLOGI ACC to an FC FLOGI ACC by stripping the FCoE header and trailer from the FCoE FLOGI ACC. In an example, the FC FLOGI ACC includes a SID (e.g., FF:FF:FE) and a DID (e.g., 03:01:00). The first converter 206 sends that FC FLOGI ACC through the first port 210a to the initiator HBA 214a in the server IHS 214.

The method 400 then proceeds to block 410 where the initiator HBA in the server IHS sends an FC port login (PLOGI) to the switch IHS. In an embodiment, in response to receiving the FC FLOGI ACC, the initiator HBA 214a in the server IHS 214 generates and sends an FC PLOGI that may include the Name Server WKA 0xFFFFFC to the first port 210a on the switch IHS 202. In an example, the FC PLOGI includes a SID (e.g., 03:01:00) and a DID (e.g., FF:FF:FC, the Name Server WKA).

The method 400 then proceeds to block 412 where the first converter converts the FC PLOGI to an FCoE PLOGI and provides the FCoE PLOGI to the protocol processing engine. In an embodiment, the first converter 206 receives the FC PLOGI through the first port 210a and provides it to the FC-to-FCoE engine 206a, which operates to convert the FC PLOGI to an FCoE PLOGI by wrapping the FC PLOGI in an FCoE header and trailer. In an example, the FCoE PLOGI may include an SMAC address (e.g., 00:00:00:03:01:00), a DMAC address (e.g., 00:00:00:FF:FF:FC, a pre-programmed WKA L2 cache entry), a SID (e.g., 03:01:00) and a DID (e.g., FF:FF:FC). The first converter 206 sends that FCoE PLOGI to the protocol processing engine 204. In an embodiment, the Ethernet switch chip in the protocol processing engine 204 receives the FCoE PLOGI and provides it to the CPU in the protocol processing engine 204.

The method 400 then proceeds to block 414 where the protocol processing engine sends an FCoE PLOGI ACC to the first converter. In an embodiment, the protocol processing engine 204 receives the FCoE PLOGI and, if the FCoE PLOGI is accepted, replies with an FCoE PLOGI ACC that is sent to the first converter 206. In an embodiment, the CPU in the protocol processing engine 204 determines whether the FCoE PLOGI is accepted and, if so, sends an FCoE PLOGI ACC to the Ethernet switch chip in the protocol processing engine 204, which forwards the FCoE PLOGI ACC to the first converter 206. Processing actions to determine whether an FCoE PLOGI is accepted are known in the art and not discussed in further detail here. In an example, an FCoE PLOGI ACC may include an SMAC address (e.g., 00:00:00:FF:FF:FC), a DMAC address (e.g., 00:00:00:03:01:00), a SID (e.g. FF:FF:FC), and a DID (e.g., 03:01:00).

The method 400 then proceeds to block 416 where the first converter converts the FCoE PLOGI ACC to an FC PLOGI ACC and provides the FC PLOGI ACC to the initiator HBA in the server IHS. In an embodiment, the first converter 206 receives the FCoE PLOGI ACC from the protocol processing engine 204 and provides it to the FCoE-to-FC engine 206b, which operates to convert the FCoE PLOGI ACC to an FC PLOGI ACC by stripping the FCoE header and trailer from the FCoE PLOGI ACC. In an example, the FC PLOGI ACC includes a SID (e.g., FF:FF:FC) and a DID (e.g., 03:01:00). The first converter 206 sends that FC PLOGI ACC through the first port 210a to the initiator HBA 214a in the server IHS 214.

The method 400 then proceeds to block 418 where the imitator HBA in the server IHS sends one or more FC name server registrations and/or FC name server queries to the switch IHS. In an embodiment, in response to receiving the FC PLOGI ACC, the initiator HBA 214a in the server IHS 214 generates and sends one or more FC name server registrations and/or FC name server queries that may include a Name Server WKA 0xFFFFFC to the first port 210a on the switch IHS 202. In an example, the one or more FC name server registrations and/or FC name server queries includes a SID (e.g., 03:02:00) and a DID (e.g., FF:FF:FC).

The method 400 then proceeds to block 420 where the first converter converts the one or more FC name server registrations and/or FC name server queries to one or more FCoE name server registrations and/or FCoE name server queries and provides the one or more FCoE name server registrations and/or FCoE name server queries to the protocol processing engine. In an embodiment, the first converter 206 receives the one or more FC name server registrations and/or FC name server queries through the first port 210a and provides them to the FC-to-FCoE engine 206a, which operates to convert the one or more FC name server registrations and/or FC name server queries to one or more FCoE name server registrations and/or FCoE name server queries by wrapping the one or more FC name server registrations and/or FC name server queries in an FCoE header and trailer. In an example, the one or more FCoE name server registrations and/or FCoE name server queries may include an SMAC address (e.g., 00:00:00:03:02:00), a DMAC address (e.g., 00:00:00:FF:FF:FC), a SID (e.g., 03:02:00) and a DID (e.g., FF:FF:FC). The first converter 206 sends those one or more FCoE name server registrations and/or FCoE name server queries to the protocol processing engine 204. In an embodiment, the Ethernet switch chip in the protocol processing engine 204 receives the one or more FCoE name server registrations and/or FCoE name server queries and provides the one or more FCoE name server registrations and/or FCoE name server queries to the CPU in the protocol processing engine 204.

The method 400 then proceeds to block 422 where the protocol processing engine sends one or more FCoE name server registration accepts (ACCS) and/or FCoE name server query ACCS to the first converter. In an embodiment, the protocol processing engine 204 receives the one or more FCoE name server registrations and/or FCoE name server queries and, if the one or more FCoE name server registrations and/or FCoE name server queries are accepted, replies with one or more FCoE name server registration ACCS and/or FCOE name server query ACCS that are sent to the first converter 206. In an embodiment, the CPU in the protocol processing engine 204 determines whether the one or more FCoE name server registrations and/or FCoE name server queries are accepted and, if so, sends the one or more FCoE name server registration ACCS and/or FC name server query ACCS to the Ethernet switch chip in the protocol processing engine 204, which provides the one or more FCoE name server registration ACCS and/or FC name server query ACCS to the first converter 206. Processing actions to determine whether one or more FCoE name server registrations and/or FCoE name server queries are accepted are known in the art and not discussed in further detail here.

The method 400 then proceeds to block 424 where the first converter converts the one or more FCoE name server registration ACCS and/or FCoE name server query ACCS to one or more FC name server registration ACCS and/or FC name server query ACCS and provides the one or more FC name server registration ACCS and/or FC name server query ACCS to the initiator HBA in the server IHS. In an embodiment, the first converter 206 receives the one or more FCoE name server registration ACCS and/or FCoE name server query ACCS from the protocol processing engine 204 and provides it to the FCoE-to-FC engine 206b, which operates to convert the one or more FCoE name server registration ACCS and/or FCoE name server query ACCS to one or more FC name server registration ACCS and/or FC name server query ACCS by stripping the FCoE header and trailer from the one or more FCoE name server registration ACCS and/or FCoE name server query ACCS. The first converter 206 sends those one or more FCoE name server registration ACCS and/or FCoE name server query ACCS to the initiator HBA 214a in the server IHS 214.

The method 400 then proceeds to block 426 where the initiator HBA in the server IHS sends an FC device PLOGI starting a SCSI conversation to the switch IHS. In an embodiment, in response to receiving the one or more FCoE name server registration ACCS and/or FCoE name server query ACCS, the initiator HBA 214a in the server IHS 214 generates and sends FC device PLOGI starting a SCSI conversation to the first port 210a on the switch IHS 202. In an example, the FC device PLOGI starting a SCSI conversation includes a SID (e.g., 03:01:00) and a DID (e.g., 03:02:00).

The method 400 then proceeds to block 428 where the first converter converts the FC device PLOGI to an FCoE device PLOGI and provides the FCoE device PLOGI to the protocol processing engine. In an embodiment, the first converter 206 receives the FC device PLOGI through the first port 210a and provides it to the FC-to-FCoE engine 206a, which operates to convert the FC device PLOGI to an FCoE device PLOGI by wrapping the FC device PLOGI in an FCoE header and trailer. The first converter 206 sends the FCoE device PLOGI to the protocol processing engine 204. In an embodiment, the Ethernet switch chip in the protocol processing engine 204 receives the FCoE device PLOGI and provides the FCoE device PLOGI to the CPU in the protocol processing engine 204.

The method 400 then proceeds to block 430 where the protocol processing engine sends an FCoE device PLOGI accept (ACC) to the first converter. In an embodiment, the protocol processing engine 204 receives the FCoE device PLOGI and, if the FCoE device PLOGI is accepted, replies with an FCoE device PLOGI ACC that is sent to the first converter 206. In an embodiment, the CPU in the protocol processing engine 204 determines whether the FCoE device PLOGI is accepted and, if so, sends the FCoE device PLOGI ACC to the Ethernet switch chip in the protocol processing engine 204, which provides the FCoE device PLOGI ACC to the first converter 206. Processing actions to determine whether an FCoE device PLOGI is accepted are known in the art and not discussed in further detail here.

The method 400 then proceeds to block 432 where the first converter converts the FCoE device PLOGI ACC to an FC device PLOGI ACC and provides the FC device PLOGI ACC to the initiator HBA in the server IHS. In an embodiment, the first converter 206 receives the FCoE device PLOGI ACC from the protocol processing engine 204 and provides it to the FCoE-to-FC engine 206b, which operates to convert the FCoE device PLOGI ACC to an FC device PLOGI ACC by stripping the FCoE header and trailer from the FCoE device PLOGI ACC. The first converter 206 sends the FC device PLOGI ACC to the initiator HBA 214a in the server IHS 214. Following the initiator HBA 214a in the server IHS 214 receiving the FC device PLOGI ACC, the server IHS 214 and switch IHS 202 are set up for communication, and the method 400 may proceed to method 500, discussed below, where the switch IHS transmits data traffic between the server IHS 214 and the storage IHS 216, discussed below. Following the methods 300 and 400, the Ethernet L2 forwarding tables in the switch IHS 202 are programmed to provide direct server IHS 214/storage IHS 216 data plane traffic and communications with an SMAC address (e.g., 00:00:00:03:01:00), a SID (03:01:00), a DMAC address (e.g., 00:00:00:03:02:00), and a DID (03:02:00).

Referring now to FIG. 5, a method 500 for providing server/storage communication is illustrated that includes blocks 502a, 504a, 506a, and 508a that describe communications that initiate from the server IHS 214 and that are provided by the switch IHS 202 to the storage IHS 216, and blocks 502b, 504b, 506b, and 508b that describe communications that initiate from the storage IHS 216 and that are provided by the switch IHS 202 to the server IHS 214. In these embodiments, the blocks 502a-508a and 502b-508b are substantially similar and described in parallel, but one of skill in the art in possession of the present disclosure will recognize that some modifications to the blocks 502a-508a or 502b-508b will fall within the scope of the present disclosure.

At block 502a, the initiator HBA in the server IHS sends FC data traffic to the switch IHS. In an embodiment, the initiator HBA 214a in the server IHS 214 may send FC data traffic to the first converter 206 in the switch IHS 202 through the first port 210a. Similarly, at block 502b, the target HBA in the storage IHS sends FC data traffic to the switch IHS. In an embodiment, the target HBA 216a in the storage IHS 216 may send FC data traffic to the second converter 208 in the switch IHS 202 through the second port 212a.

At block 504a, the first converter converts the FC data traffic to FCoE data traffic and sends the FCoE data traffic to the protocol processing engine. In an embodiment, the first converter 206 receives the FC data traffic and provides it to the FC-to-FCoE engine 206a, which converts the FC data traffic to FCoE data traffic by wrapping the FC data traffic in an FCoE header and trailer. The first converter 206 sends that FCoE data traffic to the protocol processing engine 204. In an embodiment, the Ethernet switch chip in the protocol processing engine 204 receives the FCoE data traffic. Similarly, at block 504b, the second converter converts the FC data traffic to FCoE data traffic and sends the FCoE data traffic to the protocol processing engine. In an embodiment, the second converter 208 receives the FC data traffic and provides it to the FC-to-FCoE engine 208a, which converts the FC data traffic to FCoE data traffic by wrapping the FC data traffic in an FCoE header and trailer. The second converter 208 sends that FCoE data traffic to the protocol processing engine 204. In an embodiment, the Ethernet switch chip in the protocol processing engine 204 receives the FCoE data traffic.

At block 506a, the protocol processing engine processes the FCoE data traffic and sends it to the second converter. In an embodiment, the protocol processing engine 204 processes the FCoE data traffic and forwards the processed FCoE data traffic to the second converter 208. In an embodiment, the Ethernet switch chip in the protocol processing engine 204 processes the FCoE data traffic using the forwarding tables, and forwards it to the second converter 208. Similarly, at block 506b, the protocol processing engine processes the FCoE data traffic and sends it to the first converter. In an embodiment, the protocol processing engine 204 processes the FCoE data traffic and forwards the processed FCoE data traffic to the first converter 206. In an embodiment, the Ethernet switch chip in the protocol processing engine 204 processes the FCoE data traffic using the forwarding tables, and forwards it to the second converter 208. The actions performed by the Ethernet switch chip in the protocol processing engine 204 in processing and forwarding the FCoE data traffic may include MAC address-based forwarding actions known in the art.

At block 508a, the second converter converts the FCoE data traffic to FC data traffic and sends the FC data traffic to the target HBA in the storage IHS. In an embodiment, the second converter 208 receives the FCoE data traffic and provides it to the FCoE-to-FC engine 208b, which converts the FCoE data traffic to FC data traffic by stripping the FCoE header and trailer from the FCoE data traffic. The second converter 208 then sends the FC data traffic through second port 212a to the target HBA 216a in the storage IHS 216. Similarly, at block 508b, the first converter converts the FCoE data traffic to FC data traffic and sends the FC data traffic to the initiator HBA in the server IHS. In an embodiment, the first converter 206 receives the FCoE data traffic and provides it to the FCoE-to-FC engine 206b, which converts the FCoE data traffic to FC data traffic by stripping the FCoE header and trailer from the FCoE data traffic. The first converter 206 then sends the FC data traffic through first port 210a to the initiator HBA 214a in the server IHS 214.

Thus, systems and methods have been described that provide a Fibre Channel switching system that allows Fibre Channel communications between IHSs via a switch IHS that includes programmed PHY chips that perform FC to FCoE (and FCoE to FC) protocol conversions such that an Ethernet switch chip may be utilized to make switching decisions using FCoE headers and Ethernet L2 forwarding tables. These systems and methods provide for the manufacture and use of switch IHSs in FC SAN systems that are inexpensive relative to conventional FC switches, reducing the current barriers to entry into the FC switch market, and opening up the use of FC fabric technology to more users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel (FC) switch, comprising:
   a chassis;
   a first PHY converter that is housed in the chassis and that is coupled to a first port on the chassis, wherein FCoE formatted FC Well Known Addresses (WKAs) are registered in the first PHY converter as Ethernet bridging protocol addresses, and wherein the first PHY converter is configured to receive first FC protocol data traffic from an initiator system through the first port and convert the first FC protocol data traffic to first FC over Ethernet (FCoE) protocol data traffic;
   an Ethernet switch chip that is housed in the chassis and that is coupled to the first PHY converter, wherein standard Ethernet bridging protocol addresses in a cache of the Ethernet switch chip have been replaced with FC routing entries, and wherein the Ethernet switch chip is configured to provide a protocol processing engine that is configured to receive the first FCoE protocol data traffic from the first converter and process the first FCoE protocol data traffic to provide second FCoE protocol data traffic for delivery to a target system; and a second PHY converter that is housed in the chassis and that is coupled to the protocol processing engine and a second port on the chassis, wherein FCoE formatted FC Well Known Addresses (WKAs) are registered in the second PHY converter as Ethernet bridging protocol addresses, and wherein the second PHY converter is configured to receive the second FCoE protocol data traffic from the protocol processing engine, convert the second FCoE protocol data traffic to second FC protocol data traffic, and send the second FC protocol data traffic through the second port to the target system.

2. The system of claim 1, wherein the conversion of the first FC protocol data traffic to the first FCoE protocol data traffic by the first PHY converter includes generating an FCoE source address for the initiator system from an FC source address for the initiator system that is included in the first FC protocol data traffic.

3. The system of claim 1, wherein the conversion of the first FC protocol data traffic to the first FCoE protocol data traffic by the first PHY converter includes generating an FCoE destination address for the target system from an FC destination address for the target system that is included in the first FC protocol data traffic.

4. The system of claim 1, wherein the standard Ethernet bridging protocol addresses are deregistered from the cache of the Ethernet switch chip.

5. The system of claim 1, the Ethernet switch chip is configured such that broadcast data traffic, multicast data traffic, and unknown unicast data traffic are not forwarded.

6. An information handling system (IHS) network, comprising:
a server IHS that is configured to communicate using a Fibre Channel (FC) protocol;
a storage IHS that is configured to communicate using the FC protocol; and
a switch IHS coupled to the server IHS and the storage IHS, wherein the switch IHS includes:
a chassis;
a first PHY converter that is housed in the chassis, wherein FCoE formatted FC Well Known Addresses (WKAs) are registered in the first PHY converter as Ethernet bridging protocol addresses, and wherein the first PHY converter is configured to receive first FC protocol data traffic from the server IHS and convert the first FC protocol data traffic to first FC over Ethernet (FCoE) protocol data traffic;
an Ethernet switch chip that is coupled to the first PHY converter, wherein standard Ethernet bridging protocol addresses in a cache of the Ethernet switch chip have been replaced with FC routing entries, and wherein the Ethernet switch chip is configured to provide a protocol processing engine that is configured to receive the first FCoE protocol data traffic from the first converter and process the first FCoE protocol data traffic to provide second FCoE protocol data traffic for delivery to the storage IHS; and
a second PHY converter that is housed in the chassis and that is coupled to the protocol processing engine and the storage IHS, wherein FCoE formatted FC Well Known Addresses (WKAs) are registered in the second PHY converter as Ethernet bridging protocol addresses, and wherein the second PHY converter is configured to receive the second FCoE protocol data traffic from the protocol processing engine, convert the second FCoE protocol data traffic to second FC protocol data traffic, and send the second FC protocol data traffic to the storage IHS.

7. The IHS of claim 6, wherein the conversion of the first FC protocol data traffic to the first FCoE protocol data traffic by the first PHY converter includes generating an FCoE source address for the server IHS from an FC source address for the server IHS that is included in the first FC protocol data traffic.

8. The IHS of claim 6, wherein the conversion of the first FC protocol data traffic to the first FCoE protocol data traffic by the first PHY converter includes generating an FCoE destination address for the storage IHS from an FC destination address for the storage IHS that is included in the first FC data traffic.

9. The IHS of claim 6, wherein the standard Ethernet bridging protocol addresses are deregistered from the cache of the Ethernet switch chip.

10. The IHS of claim 6, wherein the Ethernet switch chip is configured such that broadcast data traffic, multicast data traffic, and unknown unicast data traffic are not forwarded.

11. A method for transmitting Fibre Channel (FC) protocol data traffic, comprising:
receiving, by a first PHY converter that is housed in a chassis and that includes FCoE formatted FC Well Known Addresses (WKAs) registered as Ethernet bridging protocol addresses, first FC protocol data traffic from a server IHS;
converting, by the first PHY converter, the first FC protocol data traffic to first FC over Ethernet (FCoE) protocol data traffic;
receiving, by a protocol processing engine that is provided by an Ethernet switch chip that is housed in the chassis and that includes a cache in which standard Ethernet bridging protocol addresses have been replaced with FC routing entries, the first FCoE protocol data traffic from the first PHY converter;
processing, by the protocol processing engine, the first FCoE protocol data traffic to provide second FCoE protocol data traffic for delivery to a storage IHS;
receiving, by a second PHY converter that is housed in the chassis and that includes FCoE formatted FC Well Known Addresses (WKAs) registered as Ethernet bridging protocol addresses, the second FCoE protocol data traffic from the protocol processing engine;
converting, by the second PHY converter, the second FCoE protocol data traffic to second FC protocol data traffic; and
sending, by the second PHY converter, the second FC protocol data traffic to the storage IHS.

12. The method of claim 11, wherein the conversion of the first FC data traffic to the first FCoE protocol data traffic by the first PHY converter includes generating an FCoE source address for the server IHS from an FC source address for the server IHS that is included in the first FC protocol data traffic.

13. The method of claim 11, wherein the conversion of the first FC protocol data traffic to the first FCoE protocol data traffic by the first PHY converter includes generating an FCoE destination address for the storage IHS from an FC destination address for the storage IHS that is included in the first FC protocol data traffic.

14. The method of claim 11, wherein the standard Ethernet bridging protocol addresses are deregistered from the cache of the Ethernet switch chip.

15. The method of claim 11, wherein the Ethernet switch chip is configured such that broadcast data traffic, multicast data traffic, and unknown unicast data traffic are not forwarded.

* * * * *